United States Patent [19]
Kohler et al.

[11] 3,764,726
[45] Oct. 9, 1973

[54] TERMINAL FOR ELECTRICAL APPARATUS WITH CONDUCTORS COOLED DOWN TO A LOW TEMPERATURE

[75] Inventors: Hubert Kohler, Eltersdorf; Fritz Schmidt, Erlangen, both of Germany

[73] Assignee: Siemens Aktiengesellschaft, Munich, Germany

[22] Filed: Nov. 2, 1972

[21] Appl. No.: 303,060

[30] Foreign Application Priority Data
Nov. 17, 1971 Germany .................. P 21 57 125.5

[52] U.S. Cl........ 174/15 BH, 174/DIG. 6, 323/44 F
[51] Int. Cl........................................... H01v 11/00
[58] Field of Search.................. 174/11 BH, 12 BH, 174/15 BH, 15 R, 15 C, DIG. 6, 19; 323/79, 44 F; 325/216

[56] References Cited
UNITED STATES PATENTS
| | | |
|---|---|---|
| 3,695,057 | 10/1972 | Moisson-Frankhauser....... 174/15 R |
| 3,701,944 | 10/1972 | Amalric........................... 174/11 BH |
| 3,522,361 | 7/1970 | Kafka............................... 174/15 C |

Primary Examiner—Bernard A. Gilheany
Assistant Examiner—A. T. Grimley
Attorney—Hugh A. Chapin et al.

[57] ABSTRACT

A high voltage-resistant, current feed terminal to a superconductor cooled down to a low temperature, with its connected normal conductor being provided with a heat exchanger. Coolant input lines and coolant output lines each form spirals having turns which surround the normal conductor and which are designed as voltage dividers. The spiral-shaped design has the advantage that the coolant line can take up a high potential gradient. The voltage divider causes a uniform division of the voltage in such a manner that the breakdown voltage of the coolant is not reached.

17 Claims, 2 Drawing Figures

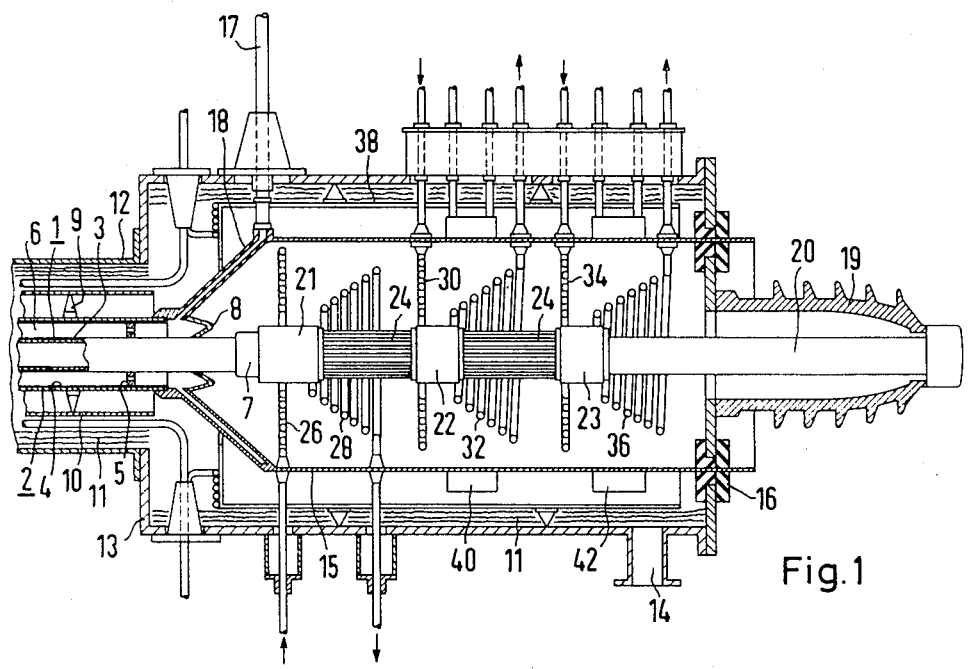
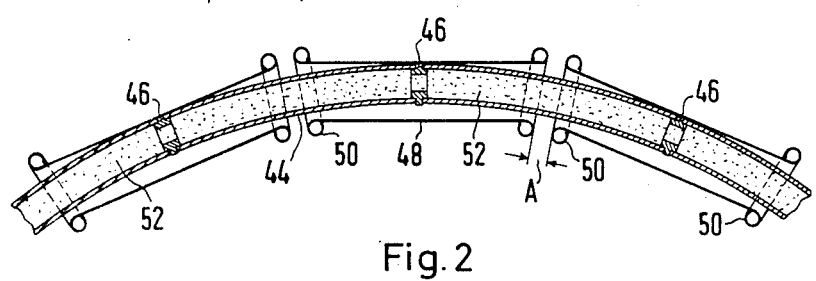

TERMINAL FOR ELECTRICAL APPARATUS WITH CONDUCTORS COOLED DOWN TO A LOW TEMPERATURE

BACKGROUND OF THE INVENTION

1. Field of the Invention

The present invention relates to a current feed terminal for electrical apparatus with conductors cooled down to low temperatures, and more particularly to superconductors, the end of which is connected to a normal conductor which is provided with a heat exchanger.

2. Description of the Prior Art

In electrical apparatus with superconductors, for instance in superconducting cables, coils or machines, electric current must frequently be fed to the superconductor, which is cooled down to a temperature below its critical temperature, from a point which is at a higher temperature, particularly at room temperature. As the superconductor would lose its superconductivity already far below room temperature, electrically normal conducting material, for instance, aluminum or copper, is used to bridge the temperature difference, which is connected with the superconductor at a point which is kept at a temperature below the critical temperature of the superconductor.

In superconducting single or three-phase cables, the conductors can be designed, as is well known, as concentric tubes, the inner tube of which is used as the outgoing conductor, and the outer tube as the return conductor. The three phases are interlinked outside of the cable proper. This arrangement has the advantage that the electromagnetic field is only between the inner and the outer conductor. The superconductors for a-c current of 50 Hz. are preferably made of pure metals, such as niobium or lead. These have only very low hysteresis losses so long as a predetermined critical field strength is not exceeded. Such cables with concentric conductors can be operated at high voltages of, for example, 200 kV and more. Since superconducting cables are used in the range of about 1 GW and up, the terminals must, therefore, be designed not only for high voltage, but also for high currents of about 10 kA and up.

As the coolant for superconductors, only helium can be considered for all practical purposes. Required is, therefore, not only a current feed for high voltage and high currents, which is designed for a temperature gradient from room temperature to below the critical temperature of the superconductor, but also a voltage-resistant feed-in of the cooling media, as the latter are at the potential of the conductor and, therefore, at high voltage.

In the German Published Pat. application No. 1,655,940, there is disclosed a current feed for a superconducting cable wherein heat exchangers are provided which are in direct contact with the normal conductor. This type of construction, however, is suitable only for medium conductor voltages because of the relatively short length of the coolant feeds.

In the publication "Conference on Low Temperatures, Electric and Power," London, March 24, to 26, 1969, p. 254, 255 and 259, a current feed to a superconductor is disclosed which has heat exchangers for the normal conductor, which are separated from the normal conductor by insulating materials. For a high voltage-resistant terminal, accordingly high-quality electrical insulating materials must be used. Such insulating materials, however, are poor heat conductors. With this type of design, one, therefore, obtains relatively poor heat removal with increasing voltage and high current.

Although one can use, in such current feeds for conductors which are at cryogenic temperature, the rising gas which is generated by the boiling of the cooling liquid and which is warmed up accordingly, problems can arise in the cooling of the current feed. Specifically, problems can arise in the cooling of electrical apparatus with superconductors, particularly superconducting a-c cables, due to a gaseous-liquid two-phase mixture as the evaporation which takes place along the cable leads to a steadily increasing flow velocity of the gas. This gas carries the drops of the liquid along and thereby prevents uniform cooling.

The use of evaporating cooling media with separate cooling units for cooling the current feed has, furthermore, the disadvantage that only a relatively small voltage difference can be bridged, since evaporating cooling media in the gaseous state at normal pressure have a substantially reduced breakdown voltage, as is well known. At normal temperature, evaporated helium has, for example, a breakdown voltage of only about 3 kV/cm, which is even lower for flowing gas.

SUMMARY OF THE INVENTION

It is an object of the invention to provide a current feed terminal for electrical apparatus with superconductors, which is suitable for high currents and a high conductor potential at cryogenic temperatures.

The above object is achieved by the present invention which provides an input and output of the coolant to the heat exchanger consisting of electrically insulating material. The input and output are each designed as a spiral, the turns of which surround the normal conductor, and with the input and output, respectively, associated with an electrical resistance arrangement which constitutes a voltage divider which produces a voltage gradient in the cooling liquid which is smaller than the breakdown voltage for corresponding length units. The resistance arrangement can consist simply of a semiconductor layer at the inside surface of the cooling tube. This semiconductor layer produces a constant voltage gradient and, therefore, a steady voltage curve over the distance of the coolant input or output line. However, a resistance arrangement can also be provided which subdivides the total voltage over the length of the tube into preferably equal steps. For this purpose, a resistive, a resistive-capacitive or a capacitive voltage divider can be provided.

For cooling the terminal, a one-phase coolant, for instance, liquid helium, can preferably be used, which removes the heat from a heat exchanger which is disposed on the normal conductor in the immediate vicinity of the superconductor connection. For controlling the temperature of the normal conductor in steps from the temperature of the superconductor to room temperature, it may be advisable to arrange several further heat exchangers, preferably in direct contact with the normal conductor, the heat of which is conducted away by other cooling media. For instance, the heat exchanger adjacent to the superconductor connection can be cooled with helium, a further one with hydrogen and a third one with nitrogen.

A particularly advantageous further embodiment of the terminal according to the invention consists of the provision that at least the input or the output line of the coolant to the individual heat exchangers forms the surface of a truncated cone, the axis of which is approximately the same as the axis of the normal conductor. The outer diameter of each of the turns is then chosen at least approximately equal to, but preferably somewhat larger than the inside diameter of the following, larger turn of the spiral. This arrangement has the advantage that the coolant line forms at the same time a radiation shield for the heat which is radiated in the direction of the axis of the normal conductor, for instance, from a corresponding feedthrough in the direction toward the superconductor.

BRIEF DESCRIPTION OF THE DRAWINGS

FIG. 1 schematically illustrates an embodiment of a terminal for a superconductor according to the invention, and specifically shows a longitudinal cross section through a terminal for one phase with coaxially related outgoing and return conductor; and FIG. 2 shows a particular design of a voltage divider used in the terminal of FIG. 1.

DESCRIPTION OF THE PREFERRED EMBODIMENT

In FIG. 1, two coaxially disposed carriers 1 and 2 are provided, each for one superconductor. The carrier 1 is provided with a superconducting layer 3 on the outside, and the carrier 2 in a similar manner with a superconducting layer 4 on the inside. The superconductor 3 may, for example, be the outgoing conductor, and the superconductor 4 the return conductor of the same phase of a superconducting cable. In the space between the two superconducting layers 3 and 4 is located a suitable liquid cooling medium 6, particularly helium, which keeps the superconductors 3 and 4 below their critical temperature and, in the embodiment shown, is at the same time used for cooling and voltage insulation. The position and space between the superconducting layers 3 and 4 is set in known manner by spacers 5.

Deviating from the embodiment shown, the liquid helium which serves as the coolant can also be conducted inside the carrier 1 and outside the carrier 2 in an additional tube. Such a design makes insulation possible between the two superconductors 3 and 4 by means of a high vacuum, a suitable synthetic material or a stationary, non-flowing coolant.

An insulator 8 is arranged at the end of the concentric system with the superconductors 3 and 4. The conductor arrangement rests on a radiation shield 10 by means of supports 9. Radiation shield 10 is supported by means of thermal insulation 11 in an outer protective pipe 12. To the protective pipe 12 is connected a vacuum vessel 13, which is provided with a connection 14 for a high-vacuum pump, not shown, and which contains the entire terminal with a normal conductor 20. The return conductor 4 is enlarged within the vacuum vessel 13 via a conical, hollow coolant input 18 to form a cylindrical conductor 15, which is brought out by means of a high-vacuum seal 16. The coolant input 18 is connected to a supply line 17.

The current feed to the outgoing conductor 3 is established via a normal-conducting bushing 19, which is at normal temperature and high voltage and which may optionally be provided with a separate cooling arrangement. Bushing 19 may consist in a known manner of an insulator which must be designed on the outside for adequate dielectric strength in air and on the inside for high vacuum.

Normal conductor 20 may consist of copper or aluminum and may be a solid conductor inside the bushing 19. On the normal conductor 20 are situated three heat exchangers 21, 22 and 23, which are in direct contact with the normal conductor 20, which in this region may preferably consist of fine wires, a thin woven screen or thin individual cylinders, which are designated with numeral 24. In some cases, it may also be advisable to make the normal conductor in the region of the heat exchangers 21 to 23 of a different material, preferably nickel. The gauge of such thin individual conductors 24 is determined by the depth of penetration of the current at the frequency of the conductor and by the respective temperature. The different heat exchangers 21 to 23 can preferably be cooled with different cooling media for establishing the temperature gradient between the superconductors 3 and 4 and the normal temperature outside the bushing 19. Liquid helium can be fed to the heat exchanger 21 via a coolant supply line 26 made in the form of a spiral, which is discharged via a coolant discharge line, the spiral of which forms a truncated cone. The truncated cone is designed so that the outside diameter of a smaller turn is at least approximately as large, and preferably equal to or larger than the inside diameter of the adjacent larger turn. In this embodiment, the coolant discharge line 28 serves at the same time as a radiation shield for heat rays which enter approximately in the direction of the normal conductor 20 into the vacuum vessel 13 and are directed toward the superconductors 3 and 4. The next heat exchanger 22 can be cooled with hydrogen via a coolant supply and discharge line 30 and 32, respectively, designed in a similar manner. For the third heat exchanger 23, nitrogen may be provided as the coolant which is fed in via a supply line 34 and is discharged via a line 36. In this design, the normal conductor is cooled down in steps in the region of the three heat exchangers from room temperature via the temperature of the liquid nitrogen with about 77° K and the temperature of the liquid hydrogen of about 20° K to the temperature of the liquid helium with about 4° K, so that the superconductor connection 7 is below the critical temperature of the superconducting materials.

Also, the cylindrical return conductor 15, which is situated in the vacuum vessel 13 within a radiation shield 38 cooled with nitrogen or hydrogen, can advantageously be provided with heat exchangers which are designated in the FIG. 1 with numerals 40 and 42 and to which can be fed hydrogen or nitrogen as the coolant via coolant feed and discharge lines, which are shown but not further marked. The heat exchanger 40 can advantageously be cooled with hydrogen and the heat exchanger 42 with nitrogen.

In order to obtain a path as long as possible for the coolant feed lines in at the same time a small space, these lines are led in spiral fashion from the inside to the outside. Such coolant lines 26, 28, 30, 32, 34 and 36 can preferably be designed at the same time as a resistive, resistive-capacitive or as a capacitive voltage divider, as is shown in FIG. 2. Since a capacitive voltage divider generates practically no thermal losses, it appears particularly well suited for an a-c terminal. In the FIG. 2, one of such coolant lines, which may consist of an electrically non-conducting material such as ceramic, plastic, glass or quartz, is designated with numeral 44. Coolant line 44 is subdivided by ring-shaped connecting pieces 46 serving as potential rings arranged into individual potential steps. The potential rings 46 may consist of an electrically highly conducting material, such as copper of nickel. The potential rings 46 are on the one hand in direct contact with the cooling liquid in the cooling tube 26, and are on the other hand in electrically conducting contact with an outer metal sleeve 48. The two ends of the metal sleeve 48 are each folded over to form a hollow ring 50, in a so-called Rogowski profile. The profiles have a predetermined mutual distance A, which determines the electrode capacity. This distance determines the magnitude of the capacitive current through the voltage divider. As the flash-over voltage in a vacuum is high, this gap A can be kept relatively small. Through the spacing of the potential rings 46, the voltage drop at the individual stages of the voltage divider is determined. This voltage drop is chosen so that the breakdown voltage of the cooling liquid is not reached with a margin of safety. For the voltage resistance of the surface, the relatively long path of an insulating-tube section 52 is available in each case, which is given by the distance of two succeeding potential rings 46.

It is to be understood that, besides the design of the coolant feed and discharge as a voltage divider shown in the embodiment according to FIG. 2, other configurations are also possible to achieve voltage resistance.

In the example of the embodiment, the invention has been explained with reference to a terminal for a superconducting cable. However, the current feed according to the invention can be used generally for electrical apparatus with deep-cooled conductors.

Although the above description is directed to the preferred embodiment of the invention, it is noted that other variations and modifications will be apparent to those skilled in the art, and, therefore, may be made without departing from the spirit and scope of the present invention.

What is claimed is:

1. A current feed terminal for electrical apparatus having conductors cooled down to a low temperature, comprising:
 a normal conductor connected to the end of said terminal;
 heat exchanger means connected to said normal conductor; and
 input and output lines for the coolant to said exchanger, said input and output lines consisting of electrically insulating material with each of said lines designed as a spiral, the turns of which surround said normal conductor, and each of said input and output lines having associated therewith an electric resistance arrangement which constitutes a voltage divider producing a voltage gradient in the cooling liquid which is smaller than the breakdown voltage of the coolant for corresponding length units of said input and output lines.

2. Terminal according to claim 1, wherein said resistance arrangement consists of a semiconductor layer on the inside surface of said input or output line, respectively.

3. Terminal according to claim 1, wherein said coolant is a one-phase coolant.

4. Terminal according to claim 1, wherein at least the spiral of said input or output lines forms the surface of a truncated cone.

5. Terminal according to claim 4, wherein the inside diameter of each of the turns of said spiral is equal to or smaller than the outside diameter of the adjacent, smaller turn.

6. Terminal according to claim 1, wherein said voltage divider comprises a capacitive voltage divider.

7. Terminal according to claim 6, wherein at least one of said coolant input lines comprises individual sections which are connected with each other via annular intermediate pieces of electrically conducting material, and each of said intermediate pieces is connected with a sleeve of electrically conducting material which surrounds said coolant line, the ends of said sleeve being folded over to form a hollow ring which has a predetermined distance from the similarly formed end of the adjacent sleeve.

8. Terminal according to claim 1, wherein said heat exchanger means is arranged in a high-vacuum vessel.

9. Terminal according to claim 8, further comprising a radiation shield between said heat exchanger means and the wall of the high-vacuum vessel.

10. Terminal according to claim 9, wherein a separate cooling arrangement is provided for said radiation shield.

11. Terminal according to claim 1, wherein liquid helium is provided as the cooling medium for said heat exchanger means.

12. Terminal according to claim 1, wherein gaseous helium under overpressure is provided as the cooling medium for said heat exchanger means.

13. Terminal according to claim 1, wherein a second heat exchanger means is further provided for said normal conductor.

14. Terminal according to claim 13, wherein hydrogen is provided as the cooling medium for said second heat exchanger means.

15. Terminal according to claim 14, wherein a third heat exchanger means is further provided for said normal conductor.

16. Terminal according to claim 15, wherein liquid nitrogen under overpressure is provided as the cooling medium for said third heat exchanger means.

17. Terminal according to claim 1, wherein at least one of said input and output lines comprises a tubular line which is coated on the inside or outside with a semiconductor, the electric conductivity of which changes over the length of the tube in steps, or gradually.

* * * * *